Jan. 25, 1938. E. A. BESSOM ET AL 2,106,267
MACHINE FOR USE IN THE MANUFACTURE OF WOVEN MATERIAL
Filed Aug. 11, 1936 5 Sheets-Sheet 1
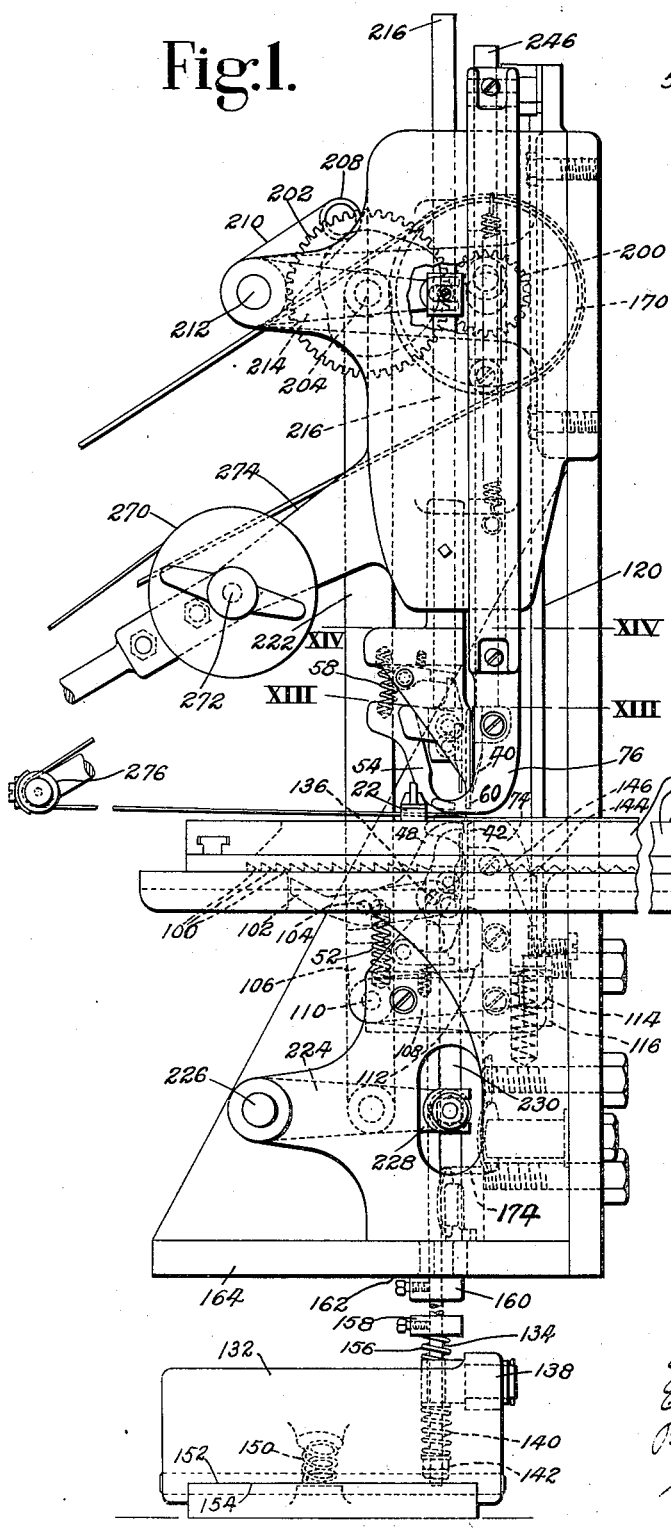
Fig.1.
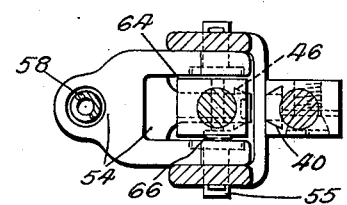
Fig.13.
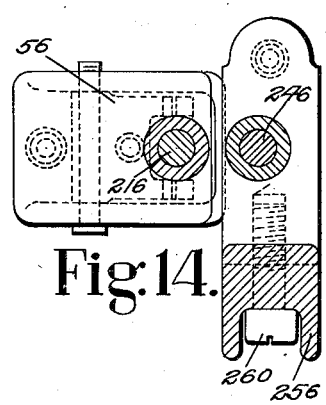
Fig.14.
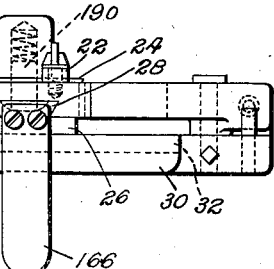
INVENTORS
Earl A. Bessom
Charles H. Pepin
By their attorney
Victor Cobb

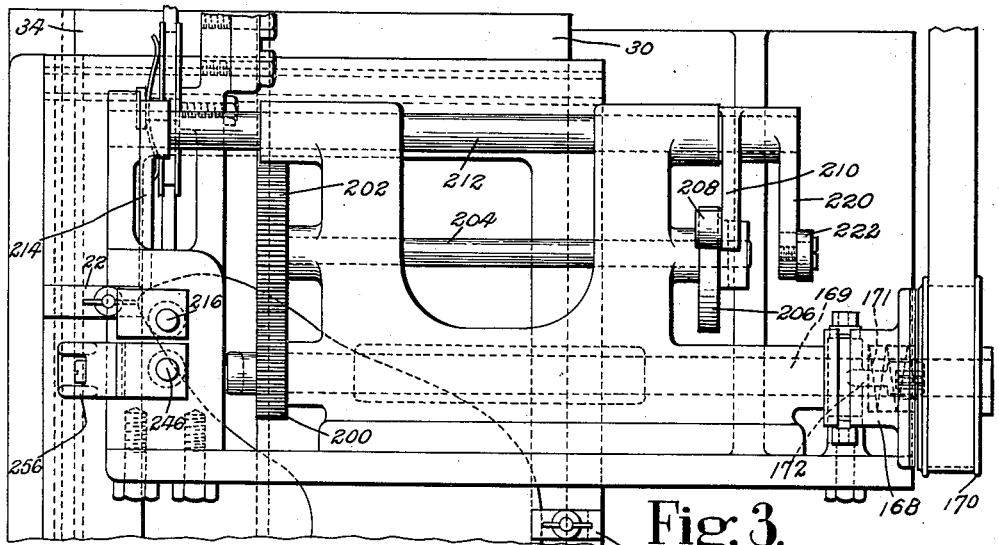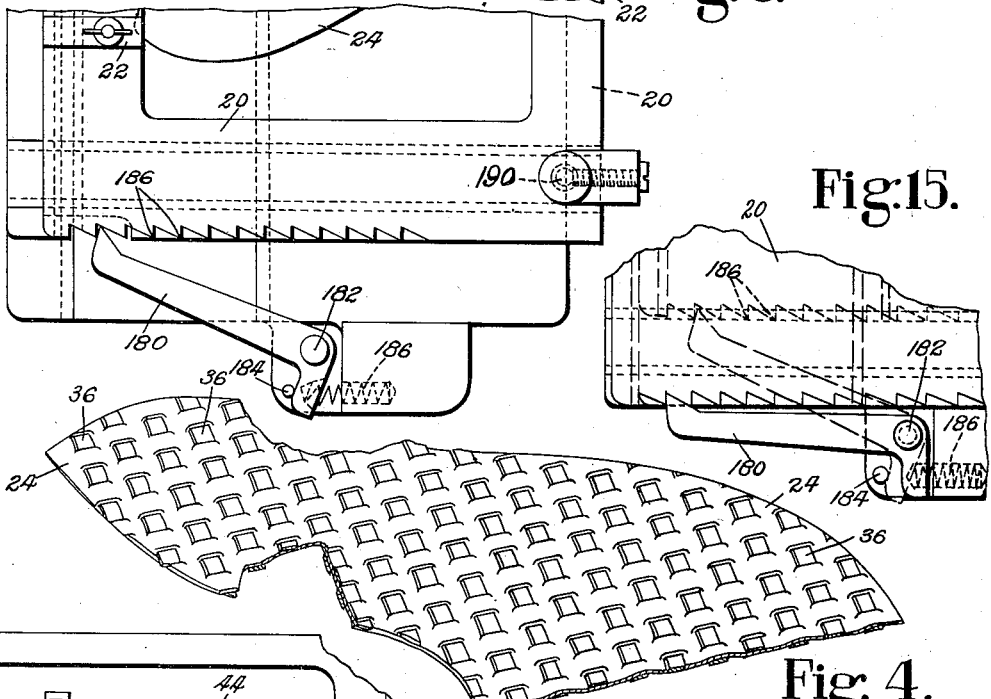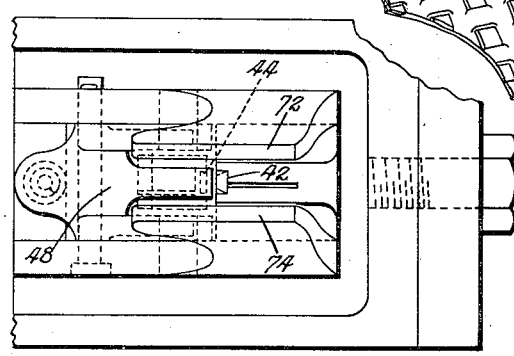

Jan. 25, 1938.  E. A. BESSOM ET AL  2,106,267
MACHINE FOR USE IN THE MANUFACTURE OF WOVEN MATERIAL
Filed Aug. 11, 1936  5 Sheets-Sheet 4

INVENTORS
Earl A. Bessom
Charles H. Pepin
By their Attorney
Victor Cobb

Jan. 25, 1938.   E. A. BESSOM ET AL   2,106,267
MACHINE FOR USE IN THE MANUFACTURE OF WOVEN MATERIAL
Filed Aug. 11, 1936   5 Sheets-Sheet 5
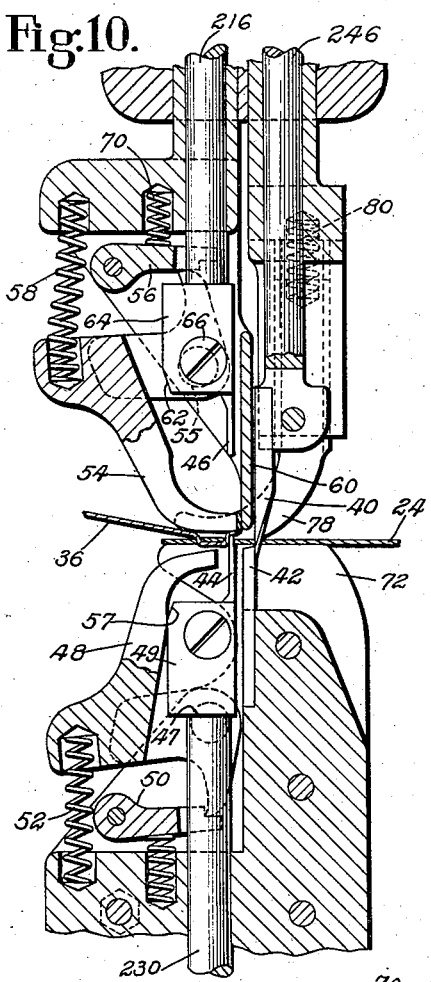
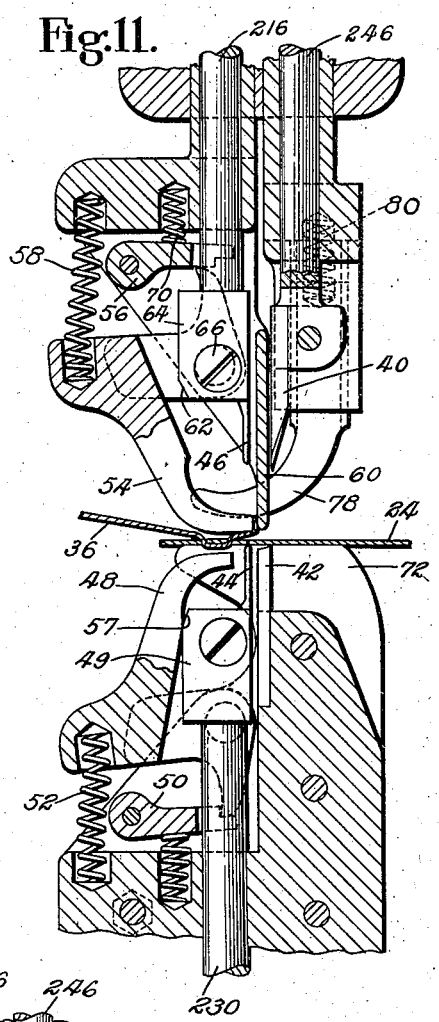
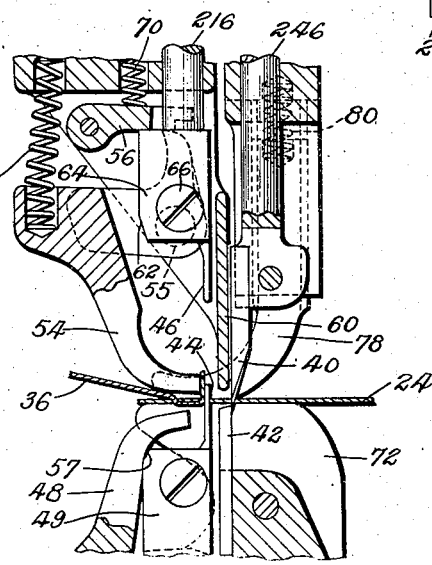

Patented Jan. 25, 1938

2,106,267

UNITED STATES PATENT OFFICE 2,106,267

MACHINE FOR USE IN THE MANUFACTURE OF WOVEN MATERIAL

Earl A. Bessom, Marblehead, and Charles H. Pepin, Beverly, Mass., assignors to United Shoe Machinery Corporation, Paterson, N. J., a corporation of New Jersey Application August 11, 1936, Serial No. 95,486

28 Claims. (Cl. 69—1)

This invention relates to machines for use in the manufacture of woven material. While the invention is illustrated as embodied in a machine for interweaving strips of material with a slitted sheet of the same or different material, it is to be understood that the invention and various important features thereof may have other applications and uses.

It is an object of this invention to provide a simple and efficient machine for lacing or weaving strips of material back and forth through slits in sheets of material whereby there is provided a fabric of basket-weave effect useful for a number of purposes, particularly because of the many variations in ornamental effect which may be readily secured. It is a further object of the invention to provide a machine of the character described which will also make slits in the sheet material progressively with the interweaving of strips through said slits.

To these ends and in accordance with an important feature of the invention there is provided in the illustrated construction means for progressively lacing or weaving strips of material through slits in sheet material alternately from opposite surfaces thereof during relative longitudinal movement of the strip and of the slitted sheet of material. Conveniently, and as shown, a cutter is intermittently operated to produce the slits in the sheet material during travel of said sheet material in an arrangement wherein a pair of tuckers, one on each side of the plane of the sheet material, operate to force the strip of material through said slits alternately from opposite surfaces of the sheet material to produce an interwoven effect of the strip and of the sheet material. As illustrated, the sheet material is secured to a movable work support which is moved intermittently predetermined distances thereby determining the spacing of the slits since the cutter operates to make a slit in the sheet material while the latter is at rest. While one slit is being formed, the strip of material is being shoved through a previously formed slit by a tucker operating from one side of the sheet material, another tucker movable with the first-mentioned tucker being subsequently operative to tuck the material through a succeeding slit in the sheet material, and gripper means being provided for pulling the strip through the slits after each tucking operation.

Another important feature of the invention resides in the provision of a special work support mechanism adapted to support sheet material for the operation of tools upon opposite surfaces of the sheet material in an arrangement wherein means is provided for moving the work support during the operation of the tools on the sheet material which is also supported against the thrust of the tools from opposite sides thereof by work rest members and presser members cooperating therewith to prevent distortion or displacement of the work piece during treatment by the tools.

These and other important features of the invention and novel combinations of parts will now be described in detail in the specification and then pointed out more particularly in the appended claims.

In the drawings,

Fig. 1 is a view in front elevation of a machine showing one embodiment of the invention;

Fig. 3 is a plan view of a machine looking downwardly from the top of Fig. 1;

Fig. 4 is a perspective view of a piece of fabric such as may be produced by the illustrated machine;

Fig. 9 is a view similar to Fig. 8 with the lower tucker in the position it assumes in tucking the end of the strip upwardly through a slit in the sheet material;

Fig. 10 is a view similar to Fig. 9 with the lower tucker partially removed and the gripper means engaged by the strip during which a new slit is formed in the sheet material by the cutter;

Fig. 11 shows the strip being held while the slitted sheet material is being fed to the left in said figure;

Fig. 12 is a sectional view of the machine shown in Figs. 1 and 2, taken along a plane corresponding to the top surface of the work support;

Fig. 13 is a sectional view taken along the line XIII—XIII of Fig. 1;

Fig. 14 is a sectional view taken along the line XIV—XIV of Fig. 1; and

Fig. 15 is a plan view of a portion of the work support showing means for moving the work support toward the front of the machine.

Figure 2:
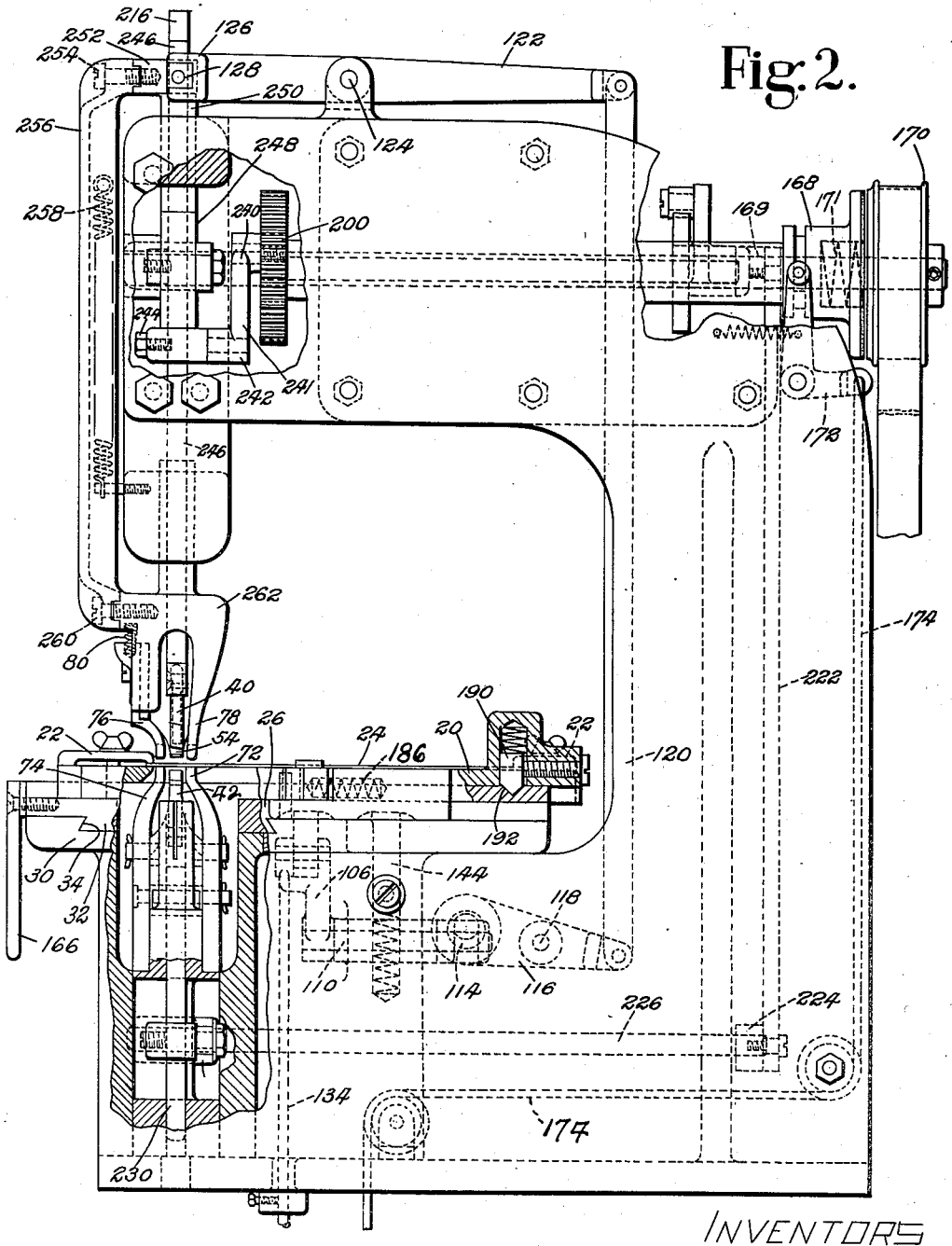
Fig. 2 is a view in side elevation looking from the right in Fig. 1.
Figure 5:
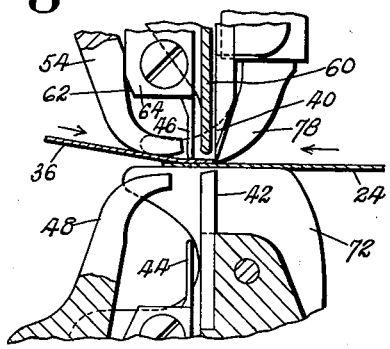
Fig. 5 is a detail of the work treating tools just an instant before a tucking operation by which a portion of a strip is forced through a slit in the sheet material.

In the illustrated machine, which is specially designed for use in the manufacture of material having an interwoven appearance, there is provided a work supporting table 20 (Figs. 1, 2, and 3) having clamping members 22 mounted thereon for holding a piece of work such as a leather vamp 24 (Fig. 3). This table 20 is movable or adjustable on a slide member 26, being dovetailed thereon, as indicated at 28 in Fig. 1. Again, the slide 26 is movable from right to left in Fig. 1, and also in a reverse direction, being guided upon a support 30 by means of an extension 32 (Fig. 2) receivable in a guideway 34 (Figs. 2 and 3) in the upper surface of said support 30. It will be understood that the work supporting table 20 is thus made movable to carry the piece of work 24 step by step into position for operation by the work treating tools, and that the table 20 is also movable in a direction at right angles to the movement just described to permit the tools to operate on the work along a path parallel to that first treated by the tools.

Upon inspection of the illustrated piece of work in Fig. 4, it will be observed that a piece of sheet material, such as the vamp 24, has been provided with a plurality of slits in parallel lines through which there has been threaded strips 36 which are preferably of a different color from that of the leather piece 24 so as to secure an ornamental effect. The machine shown in the drawings is provided with tools for cutting the slits and for threading the strips 36 therethrough, the strips being threaded through the slits alternately from one surface to the other to present an interwoven appearance of strip and of sheet material.

Figure 6:
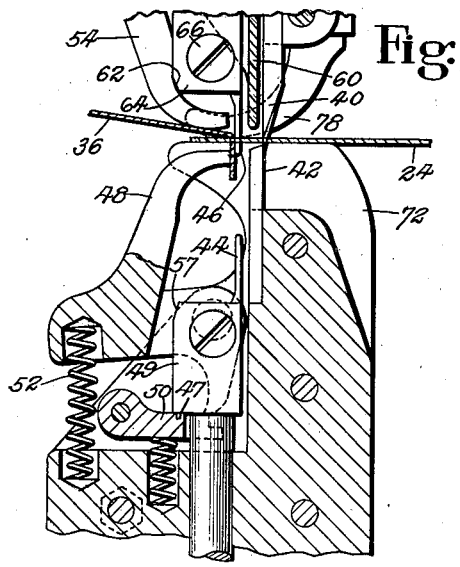
Fig. 6 is a view similar to Fig. 5 with the upper tucker at the end of its downward stroke and showing an end of the strip projecting through a slit in the sheet material.
Figure 7:
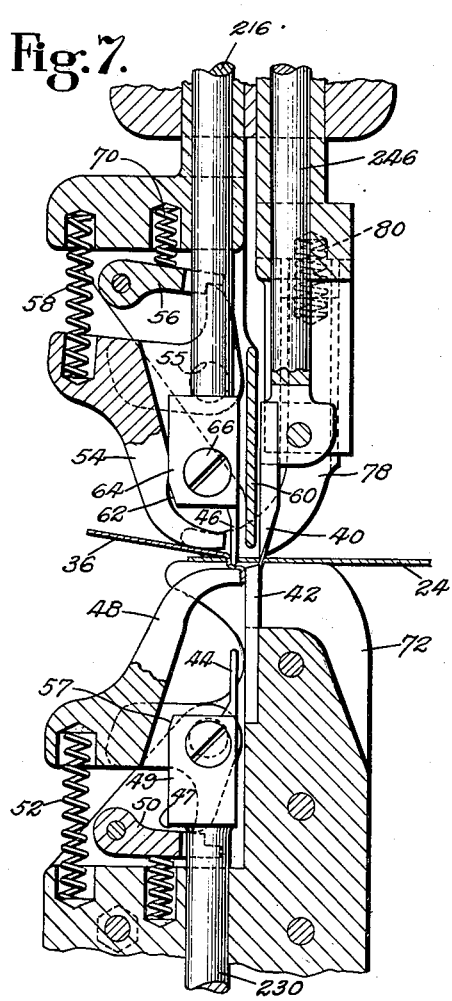
Fig. 7 is a view similar to Fig. 6 an instant later with the upper tucker in partly retracted position and with the gripper engaging the end of the strip.
Figure 8:
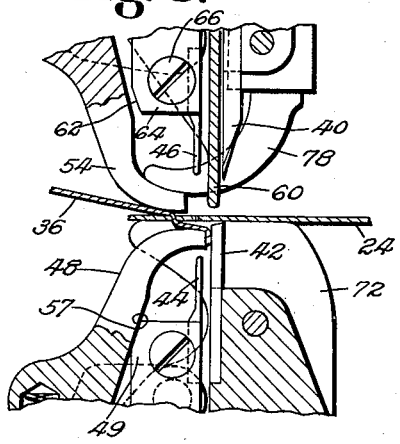
Fig. 8 shows the gripper holding the strip while the sheet material is being fed to the left in said figure.

For cutting the slits in the sheet material 24 there is provided a reciprocable cutter 40 (Figs. 5 to 11 inclusive) adapted to co-operate with a stationary cutter 42 in making a slit in the sheet material 24. The instant that the cutter 40 rises to free the work piece 24, the table 20 is moved to carry the work piece to the left a distance such that the slit just formed is positioned in line with a pair of tuckers 44, 46. As shown the tucker 44 is supported directly by a tucker holder 49. In the first tucking operation, the free end of a strip 36 is shoved downwardly through the slit by the upper tucker 46, as indicated in Fig. 6. At a certain point in the downward movement of the tuckers 46 and 44, a gripper member 48 is released by its latch member 50, this being accomplished by a flat surface 47 on the tucker holder 49 engaging the said latch member 50 and moving it downwardly to disengaging position (Fig. 6). The gripper 48 is promptly operated by its associated spring 52 in such manner that the operative end of the gripper member presses the end portion of the strip 36 against the adjacent surface of the upper tucker 46 (Fig. 6). Now, as both tuckers 44, 46 move upwardly, the tucker 46 is withdrawn from its co-operative relation with respect to the gripper bar 48 and the latter presses the end of the strip 36 against the adjacent surface of the stationary cutter 42 (Fig. 7). While this movement of the tuckers 44, 46 was taking place the cutter 40 descended to make another slit in the work piece 24 and immediately rose again to free the work piece 24. At this point the work table 20 is operated to move the work piece 24 to the left, as indicated in Fig. 8, to bring the freshly made slit in line with the tuckers 44 and 46. Since the strip 36 had its end portion gripped by the gripper member 48 in co-operation with the adjacent surface of the stationary cutter 42, movement of the work piece to the left as just described had the effect of drawing the strip through the slit in the work piece 24 and leaving the end of the strip in position to be tucked upwardly through the newly formed slit, this operation taking place upon upward movement of the tuckers 44, 46 as indicated in Fig. 9. During this upward movement of the tuckers, a gripper member 54, pivoted at 55 to a stationary support, was released by its latch 56 and was operated by its spring 58 to press the end portion of the strip 36 against the adjacent surface of the lower tucker 44. At the same time, the lower gripper 48 was moved to its latched inoperative position by engagement of a cam surface 57 on the tucker holder 49 with said gripper 48 as indicated in Figs. 8, 9, 10 and 11. Upon reversal of the direction of movement of the tuckers 44, 46, the lower tucker is withdrawn from co-operation with the gripper 54 with the result that the end of the strip 36 is instantaneously clamped against the adjacent surface of the lower end of a stationary gripper member 60. While the last described movements of the tuckers 44, 46 were taking place, the cutter 40 was making a fresh slit in the work piece 24 as indicated in Figs. 9 and 10. Hence, as soon as the end of the strip 36 is gripped between the movable gripper 54 and the stationary gripper 60, the work supporting table 20 is moved to the left to position the newly formed slit in line with the tuckers 44 and 46, the described movement of the work piece 24 to the left resulting also in causing the strip 36 to be drawn through both of the previously formed slits. Furthermore, the free end of the strip 36 is left in position to be tucked through the freshly formed slit upon descent of the upper tucker 46, as indicated in Fig. 11, it being understood that the movable gripper 54 is positively moved out of the way of the tucker 46 during downward movement of the latter by reason of the engagement of a cam surface 62 on a tucker holder member 64 within which the upper stripper 46 is securely clamped by set screw 66. This movement of the upper gripper member 54 to inoperative position under the action of the cam surface 62 is clearly indicated in Figs. 6 and 7 of the drawings, where the gripper 54 is shown in retracted position, thus permitting operation of the upper tucker 46. Fig. 7 also shows that the upper gripper 54 is promptly latched in its inoperative position by its latch member 56 acted upon by its spring 70. The operations just described are repeated until the strip 36 has been drawn through all of the slits in a given line of slits extending across the piece of work 24. Then the work supporting table 20 is shifted a space such that another strip 36 may be threaded through another line of slits parallel to those just made for the previous strip. It is to be understood that the slits in the work piece are of a length substantially greater than the width of the strip 36 which is laced therethrough, the purpose being to minimize the force necessary to tuck the strip through the slits and to draw the strip through the whole number of slits in any given row thereof.

Upon inspection of Fig. 3 of the drawings it will be observed that the work supporting table 20 is in reality an open frame having work clamping means at certain points to hold the work piece 24 thereon, this being indicated also in Figs. 1 and 2. As a matter of fact, the work piece 24 is additionally supported during operation of the cutters and of the tuckers by a work rest made up of two stationary members 72 and 74 spaced from each other from front to rear of the machine (Figs. 2 and 12) a distance slightly greater than the width of the tuckers 44 and 46, it obviously being desirable to have the work piece supported closely adjacent to the portion of the work piece being operated upon at any given instant to prevent distortion or displacement of the work piece, since the tucker must press with substantial pressure upon the end of the strip 36 to force it through the slit in the work piece 24. Moreover, it is preferable to have presser members which will engage portions of the work piece 24 resting on the work rests 72, 74 prior to the operation of the tuckers 44 and 46. For this purpose there are provided a pair of presser members 76 and 78 which are vertically movable, by means hereinafter described, the front presser member 76 co-operating with the work rest 74 and the presser member 78 with the work rest 72. Since one of the presser members 76, 78 will engage the work piece 24 where it is already supplied with the strip 36, it is obvious that the said presser member must be yielding, since it is engaging a thicker portion of the work, this being necessary to permit the other presser member to engage a thinner portion of the work, that is, that portion which contains no strip 36. As shown, the front presser member 76 is yieldingly mounted, being backed by a spring 80 (Figs. 2 and 7).

As indicated in the foregoing portions of the specification the table 20 is intermittently moved from right to left (Fig. 1) predetermined distances corresponding to the spacings between the slits in the work piece 24. For accomplishing this movement of the table 20 there is conveniently provided a pawl and ratchet mechanism. On the lower surface of the table supporting slide 26 there are a series of ratchet teeth 100 (Fig. 1) which are of a length corresponding to the width of a pawl 102 arranged for engagement selectively with said teeth and pivotally mounted at 104 in the upper end of a vertically extending arm 106 of a bell crank lever having also a substantially horizontal arm 108, the bell crank lever being pivoted at 110 on a bracket 112 extending from the frame of the machine. As clearly indicated in Fig. 1, the horizontal arm 108 of the bell crank lever is provided with a ball end 114 (Figs. 1 and 2) receivable in a socket in the adjacent end of a lever 116 extending at a right angle to lever arm 108 and pivoted on a stud 118 extending from the machine frame and having at its other end a pivotal connection with a link 120 (Fig. 2) the upper end of which is pivotally connected to a lever 122 fulcrumed at 124 on the machine frame and having a forked end 126 to receive a block 128 swivelly mounted on the upper end of the bar 246, as clearly shown in Fig. 2. From an inspection of the parts just described it will be clear that, upon downward movement of the bar 246, the pawl 102 is moved to the right in Fig. 1 to engage the next adjacent tooth 100, while upon upward movement of the bar 246, the pawl 102 is moved to the left in Fig. 1 to cause a corresponding movement of the slide 26 and of the table 20 supported thereby.

All of the time that the machine is in operation upon a given piece of work, the pawl 102 is held in operative position through connections to a treadle 132, the said connections comprising a link or rod 134 pivoted at 136 to the pawl 102 and having its lower end passing through an opening in an end portion 138 of the treadle 132, a light spring 140 being provided between the end 138 of the treadle and a nut 142 on the end of the rod 134 so that downward movement of the treadle 132 is yieldingly applied to the rod 134 and hence to the pawl 102. In other words, the pawl 102 is lightly held yieldingly in engagement with the ratchet teeth 100 by the spring 140 whereby the pawl 102 may ratchet to the right in Fig. 1 to engage the next adjacent tooth without disturbing the position of the table supporting slide 26 which is held against such displacement by a spring pressed plunger 144 selectively engageable with V-shaped notches 146 in the slide member 26 which notches are in proper correlation with the ratchet teeth 100. It will be readily understood that the notches 146 are V-shaped for co-operation with the spring pressed plunger 144 so that by the centering action of the plunger 144 with respect to the notch 146 engaged thereby, the table is positioned properly after each movement by the ratchet pawl 102. As indicated by the relative positions of pawl 102 and plunger 144 in Fig. 2, the row of notches 146 is parallel to the row of teeth 100.

When the operator's foot is removed from the treadle 132 the latter is lifted by a spring 150 until a shoulder 152 on the treadle engages a stop 154. Upward movement of the treadle 132 to terminate operation of the machine results also in upward movement of the link or rod 134, this being accomplished through the provision of a spring 156 resting on the upper surface of the end portion 138 of the treadle and engaging a collar 158 secured to the rod 134, upward movement of the rod 134 being preferably limited through proper adjustment of a collar 160, on the rod 134, which comes into engagement with a stop surface at 162 on a bracket 164 rigid with the machine frame. This upward movement of the rod 134 is sufficient to withdraw the ratchet pawl 102 from its operative relation to the ratchet teeth 100. The operator may readily shift the table supporting slide 26, together with its table 20, to the right in Fig. 1, to initial position, just as the carriage in a typewriter is shifted to return it to initial position. For this purpose the slide 26 is provided with a handle member 166 rigidly connected thereto. Upward movement of the treadle 132, as just described, also results in disconnecting a clutch member 168 on shaft 169 from a drive pulley 170 thereby bringing the machine to rest, movement of the clutch member 168 to inoperative position being accomplished by a spring 171. Through clockwise movement of a bell crank 172, which is operated from the treadle 132 through a cable 174 connected at its ends to both the bell crank lever 172 and the treadle 132, as most clearly shown in Figs. 1 and 2, the clutch is thrown in to cause operation of the machine upon depression of the treadle 132.

Shifting of the table 20 to the right in Fig. 1 to its initial position, results also in the table 20 being shifted one step toward the operator at the front of the machine whereby the work piece 24 is placed in position to have a new row of slits made therein for reception of another strip 36. This automatic shifting of the table 20 is secured by means of a latch member 180 (Fig. 15) pivoted at 182 on the machine frame and normally urged into contact with a stop pin 184 by a spring 186. The operative end of the latch member 180 selectively engages one of a number of ratchet teeth 188 on the edge of the table 20 each time that the table 20 and its carrying slide 26 are moved to the extreme right in Figs. 1 and 15. During the latter part of this movement of the table 20 and slide 26, the table 20 is forced one step toward the front of the machine by reason of the arcuate swing of the latch member 180 about its pivot 182, as clearly indicated in Fig. 15. The table 20 is yieldingly held in its new location by a spring pressed plunger 190 (Figs. 1 and 2) the latter having a V-shaped lower end to engage one of a number of correspondingly shaped notches 192 (Fig. 2), the notches 192 being properly correlated to the notches 188. It will be understood therefore that the table 20 is shifted automatically toward the front of the machine each time that the table is moved to its initial position at the extreme right of Fig. 1, preparatory to inserting another strip of material next adjacent to the strip previously inserted during the step-by-step movement of the table from right to left in Fig. 1.

For operating the tuckers 44 and 46 there is provided on the shaft 169 near the forward end thereof a pinion 200 (Figs. 1, 2 and 3) in mesh with a gear 202, in the ratio of one to two, the said gear 202 being secured to a shaft 204 (Fig. 3) which also carries fixedly secured thereto a cam 206 (Figs. 1 and 3). Contacting said cam 206 is a cam roll 208 carried by an arm 210 secured to a countershaft 212 mounted in the frame of the machine, the axes of the shafts 169, 204 and 212 being substantially in the same horizontal plane. Secured to the forward end of the shaft 212 is an arm 214 having its free end forked to engage a block swivelly mounted upon a bar or rod 216 which has the tucker block 64 and the tucker 46 secured to the lower end thereof. Secured to the other end of the shaft 212 is another arm 220 (Fig. 3) to which is pivoted a link 222 (Figs. 1 and 2), the lower end of which is also pivoted to an arm 224 secured to a shaft 226 rotatably journaled in the lower portion of the frame of the machine. At its front end, the shaft 226 has secured thereto an arm 228 the free end of which is forked to engage a block swiveled to a rod 230 which carries at its upper end the tucker block 49 and the tucker 44. Since the two arms 214 and 228 are interconnected to operate together synchronously and since said arms are of the same length, it is clear that the tuckers 44 and 46 will be moved up and down synchronously, as already described.

The pinion 200 on the shaft 169 is provided on its front face with an eccentrically mounted pin (Fig. 2) 240 on which is pivotally mounted a link 241 connected pivotally to a clamp member 242 secured by a set screw 244 to a bar or rod 246 which carries at its lower end fixedly secured thereto the reciprocatory cutter 40. This bar 246 has secured thereto a sleeve 248 the upper end of which is arranged to contact with a sleeve 250 secured to a cross piece 252 which latter is in turn secured by a set screw 254 to a presser bar 256 normally urged in a downward direction by a spring 258. The presser bar 256 has secured to its lower end by a set screw 260 a presser foot member 262 which has rigid therewith the presser foot 76 and also provides a slidable bearing for a second presser foot 78 backed by its spring 80. It will be understood that the presser bar and the two presser feet are operated by the bar 246 on upward movement of the latter and that the presser bar and presser feet are moved in a downward direction yieldingly by the spring 258 to press a portion of the work against the work rests 72 and 74, as already described in this specification. According to the arrangement of parts just described, the work is held yieldingly by the presser feet 76 and 78 each time that the reciprocatory cutter 40 makes a slit in the sheet of material carried by the work support 20 and while the tuckers 44 and 46 are operating. Furthermore, this reciprocatory cutter 40 is operated twice for each downward movement of the tucker bar 216, since slits must be provided in the work for both of the tuckers 44 and 46.

The strip material from which the strips 36 are cut is conveniently introduced into the machine by being wound upon a roll 270 rotatable on an axis 272 supported by a bracket 274 extending from the frame of the machine. Also supported by an extension from the bracket 274 is a guide roll 276 for the strip material. At the beginning of operations the operator must move the forward end of the strip material 36 into position below the cutter 40. It is to be understood that guide roll 276 is so positioned as to furnish a slack loop in the strip material which is thus readily applicable to the sheet of material under the supervision of the operator who sits at the front of the machine. In its first descent the cutter 40 cuts off any excess length at the forward end of the strip 36 and at the same time makes the first slit in the sheet of material. Hence, the first movement of the work support will move the sheet of material with the slit just made therein in such manner that one of the tuckers 44, 46 will operate to tuck the end of the strip 36 through the freshly made slit. Subsequently the strip is gripped by alternately operating gripper members 48 and 54 to draw the strip through the slits following tucking operations by said tuckers 44 and 46, as already described herein.

Having described our invention, what we claim as new and desire to secure by Letters Patent of the United States is:

1. A machine for use in the manufacture of woven material comprising members for tucking an end portion of a strip of material through slits in a sheet of material and alternately from one surface to the other of said sheet of material, and means operating in timed relation to the tucking members to draw the strip successively through said slits, thereby to secure an interwoven effect of the strip and sheet material.

2. A machine for use in the manufacture of woven material comprising tucker members for lacing a strip of material through slits in a sheet of material, the tucker members being arranged to pass the strip through the slits alternately from one surface to the other of the sheet material to secure an interwoven effect of the strip and sheet material, and gripper members cooperating with the tucker members to draw said strip through said slits.

3. A machine for use in the manufacture of woven material comprising means for forming slits one after another along a given line in a sheet of material, and means operating in timed relation to each slit forming operation for lacing a strip of material through said slits and alternately from one surface to the other of said sheet of material to secure an interwoven effect of the strip and sheet material.

4. A machine for use in the manufacture of woven material comprising means for forming slits in a sheet of material, and means for lacing a strip of material through said slits progressively with the formation of the latter, the lacing means being arranged to pass the strip through the slits alternately from one surface to the other of the sheet material to secure an interwoven effect of the strip and sheet material.

5. In a machine of the class described, a cutter to form slits progressively in a sheet of material, a tucker to force an end portion of a strip of material through the slit just made by the cutter, and means to cause relative movement between the strip and the sheet of material to draw the strip through the slit preparatory to tucking the end of the strip through a succeeding slit in the sheet material, whereby the strip is passed through a plurality of slits alternately from one surface to the other of the sheet material to produce an interwoven effect of the strip and sheet material.

6. In a machine of the class described, a cutter operative to make successive slits in a sheet of material, a pair of tuckers operative from opposite sides of the sheet material to tuck a strip of material successively through the slits from opposite sides of the sheet material, and gripper members to pull the strip through the slits, whereby there is produced an interwoven effect of the strip and sheet material.

7. In a machine of the class described, a work support for a sheet of material, means for intermittently moving the work support and said sheet in one direction, a pair of tuckers operative to tuck the end of a strip of material alternately from opposite sides of the sheet material through slits in the latter, and gripper members operative to seize the end of the strip to hold the latter against movement while the work support moves the sheet material, whereby the strip is drawn through the slits thereby to secure an interwoven effect of the strip and sheet material.

8. In a machine of the class described, a work support for a sheet of material, means for intermittently moving the work support and said sheet in one direction, a cutter operative to cut slits in the sheet material at predetermined spacings, a pair of tuckers operative to tuck the end of a strip of material alternately from opposite sides of the sheet material through said slits, and gripper members associated with the tuckers on opposite sides of the sheet material operative to seize the end of the strip to hold the latter against movement during movement of the work support and sheet material, whereby the strip is drawn through the slits alternately on opposite surfaces of the sheet material to secure an interwoven effect of the strip and sheet material.

9. In a machine of the class described, a work support for a sheet of material, means for intermittently moving the work support and said sheet in one direction, a cutter operative to cut slits in the sheet material at predetermined spacings, a pair of tuckers operative to tuck the end of a strip of material alternately from opposite sides of the sheet material through said slits, gripper members operative to seize the end of the strip to hold the latter against movement while the work support moves the sheet material whereby the strip is drawn through the slits thereby to secure an interwoven effect of the strip and sheet material, and presser members operative to hold the work against distortion or displacement during the operation of said tuckers.

10. In a machine of the class described, a work support for a sheet of material, a stationary cutter on one side of the plane of the sheet material, a cutter on the opposite side of the plane of the sheet material and reciprocable to cooperate with a stationary cutter to cut slits progressively in the sheet material, a pair of tuckers, one on each side of the plane of the sheet material to tuck the end portion of a strip of material through slits in the sheet material alternately from opposite sides thereof, a gripper member to cooperate with a surface of the stationary cutter to effect movement of the strip through a slit in the sheet material, and gripper members on the other side of the plane of the sheet material also operative to engage the end of the strip to effect movement of the strip through a slit in the sheet material, whereby the strip is drawn progressively through the slits in the sheet material to produce an interwoven effect of the strip and sheet material.

11. In a machine of the class described, a work support for a sheet of material, a stationary cutter on one side of the plane of the sheet material, a cutter on the opposite side of the plane of the sheet material and reciprocable to cooperate with a stationary cutter to cut slits progressively in the sheet material, a pair of tuckers, one on each side of the plane of the sheet material to tuck the end portion of a strip of material through slits in the sheet material alternately from opposite sides thereof, a gripper member to cooperate with a surface of the stationary cutter to effect movement of the strip through the slit or slits in the sheet material, gripper members on the other side of the plane of the sheet material also operative to engage the end of the strip to effect movement of the strip through a slit in the sheet material whereby the strip is drawn progressively through the slits in the sheet material to produce an interwoven effect of the strip and sheet material, and members supporting said tuckers and operating the latter in timed relation to each other, said tucker supporting members being also operative to control the gripper members.

12. In a machine of the class described, a work support movable to progress sheet material step by step during operations thereon, a stationary cutter on one side of the plane of the sheet material, a cutter on the opposite side of the plane of the sheet material and reciprocable to cooperate with a stationary cutter to cut slits progressively in the sheet material, a pair of tuckers, one on each side of the plane of the sheet material to tuck the end portion of a strip of material through slits in the sheet material alternately from opposite sides thereof, a gripper member to cooperate with a surface of the stationary cutter to effect movement of the strip through the slit or slits in the sheet material, gripper means on the other side of the plane of the sheet material also operative to engage the end of the strip to effect movement of the strip through the slit or slits of the sheet material whereby the strip is drawn progressively through the slits in the sheet material to produce an interwoven effect of the strip and sheet material, spring means to move the gripper members and hold them yieldingly in engagement with the strip, and means movable with the tuckers to control the time of operation of the gripper members.

13. In a machine of the class described, a work support movable to progress sheet material step by step during operations thereon, a stationary cutter on one side of the plane of the sheet material, a cutter on the opposite side of the plane of the sheet material and reciprocable to cooperate with a stationary cutter to cut slits progressively in the sheet material, a pair of tuckers, one on each side of the plane of the sheet material to tuck the end portion of a strip of material through slits in the sheet material alternately from opposite sides thereof, a gripper member to cooperate with a surface of the stationary cutter to effect movement of the strip through the slit or slits in the sheet material, gripper means on the other side of the plane of the sheet material also operative to engage the end of the strip to effect movement of the strip through the slit or slits of the sheet material whereby the strip is drawn progressively through the slits in the sheet material to produce an interwoven effect of the strip and sheet material, spring means to move the gripper members and hold them yieldingly in engagement with the end of the strip, and means operating positively to open the grippers in timed relation to the movement of the tuckers.

14. In a machine of the class described, a work support movable to progress sheet material step by step during operations thereon, a stationary cutter on one side of the plane of the sheet material, a cutter on the opposite side of the plane of the sheet material and reciprocable to cooperate with a stationary cutter to cut slits progressively in the sheet material, a pair of tuckers, one on each side of the plane of the sheet material to tuck the end portion of a strip of material through slits in the sheet material alternately from opposite sides thereof, a gripper member to cooperate with a surface of the stationary cutter to effect movement of the strip through the slit or slits in the sheet material, gripper means on the other side of the plane of the sheet material also operative to engage the end of the strip to effect movement of the strip through the slit or slits of the sheet material whereby the strip is drawn progressively through the slits in the sheet material to produce an interwoven effect of the strip and sheet material, spring means to move the gripper members and hold them yieldingly in engagement with the end of the strip, members carrying said tuckers operative also to control the movements of the gripper members, latches operative normally to hold the gripper members in inoperative position, and means movable with the tuckers to trip the latches whereby the gripper members seize the end of the strip in timed relation to the operation of the tuckers.

15. In a machine of the class described, means for cutting slits in a sheet of material in spaced relation to each other along a given line, a pair of tuckers one on each side of the plane of the sheet material to tuck an end portion of a strip of material progressively through the slits in the sheet of material, and means connected to the tuckers to move them in unison in directions toward and away from the sheet of material to perform the tucking operations alternately from opposite sides of the sheet of material, and means for causing relative movement of the strip and of the sheet of material progressively with the tucking operations whereby there is produced an interwoven effect of the strip and sheet of material.

16. In a machine of the class described, means for cutting slits in a sheet of material in spaced relation to each other along a given line, a pair of tuckers one on each side of the plane of the sheet material to tuck an end portion of a strip of material progressively through the slits in the sheet of material, means connected to the tuckers to move them in unison in directions toward and away from the sheet of material to perform the tucking operations alternately from opposite sides of the sheet of material, a work support to support and feed the sheet of material, and means to move the work support intermittently through predetermined distances to effect proper spacing of the slits made by the cutter in the sheet material.

17. In a machine of the class described, a work support for a sheet of material, a cutter to cut slits progressively in the sheet of material, a pair of tuckers, one on each side of the plane of the sheet material to tuck the end portion of a strip of material through slits in the sheet material alternately from opposite sides thereof, gripper members for the strip to effect movement of the strip through slits in the sheet material, spring means to move the gripper members and hold them yieldingly in engagement with the strip, and means movable with the tuckers to control the time of operation of the gripper members.

18. In a machine of the class described, a work support for a sheet of material, a cutter to cut slits progressively in the sheet of material, a pair of tuckers, one on each side of the plane of the sheet material to tuck the end portion of the strip of material through slits in the sheet material alternately from opposite sides thereof, gripper members for the strip to effect movement of the strip through slits in the sheet material, spring means to move the gripper members and hold them yieldingly in engagement with the end of the strip, and means operating positively to open the grippers in timed relation to the movement of the tuckers.

19. In a machine of the class described, a work support for a sheet of material, a cutter to cut slits progressively in the sheet material, a pair of tuckers, one on each side of the plane of the sheet material to tuck the end portion of a strip of material through slits in the sheet material alternately from opposite sides thereof, gripper members for the strip to effect movement of the strip through slits in the sheet material, spring means to move the gripper members and hold them yieldingly in engagement with the end of the strip, latches operative normally to hold the gripper members in inoperative position, and means movable with the tuckers to trip the latches, whereby the gripper members seize the end of the strip in timed relation to the operation of the tuckers.

20. In a machine for passing a strip of material through slits in a sheet of material, a pair of tuckers one on each side of the plane of the sheet material to tuck an end portion of the strip of material progressively through slits in the sheet of material, means connected to the tuckers to move them in directions toward and away from the sheet of material to perform the tucking operations alternately from opposite sides of the sheet of material, and means for causing relative movement of the strip and of the sheet of material progressively with the tucking operations to draw said strip through said slits, whereby there is produced an interwoven effect of the strip and sheet of material.

21. In a machine for passing a strip of material through slits in a sheet of material, a pair of tuckers one on each side of the plane of the sheet material to tuck an end portion of the strip of material progressively through the slits in the sheet of material, means connected to the tuckers to move them in directions toward and away from the sheet of material to perform the tucking operations alternately from opposite sides of the sheet of material, gripper members to hold the strip temporarily against movement after it has been tucked through a slit, a work support to support and feed the sheet of material, and means to move the work support intermittently through predetermined distances to effect drawing of said strip through slits in the sheet of material after tucking operations.

22. In a machine of the character described, a work support for sheet material to be operated upon, tools located upon opposite sides of the sheet material on the work support to operate through the work support and upon the sheet material, means to move the work support along a given path during treatment of the sheet material by said tools, and means for moving the work support in a direction at a right angle to said path of movement so that the sheet material may be operated upon by the tools along a line parallel to that first operated upon.

23. In a machine of the character described, a work support for sheet material to be operated upon, tools located upon opposite sides of the sheet material on the work support to operate through the work support and upon the sheet material, means for moving the work support intermittently along a given path during treatment of the sheet material by said tools, and means operated by the work support in its return to initial position for moving the work support in a direction at a right angle to said path preliminarily to treatment of the sheet material along a path parallel to the first-mentioned path.

24. In a machine of the character described, a work support for sheet material to be operated upon, a support upon which the work support is slidably mounted, tools located upon opposite sides of the sheet material on the work support to operate through the work support and upon the sheet material, means operative to move said support and the work support along a given path during treatment of the sheet material by said tools, and means for moving the work support upon its support in a direction at a right angle to the first-mentioned path preliminarily to intermittent movement of the work support along a path parallel to the first-mentioned path during treatment of the sheet material by said tools.

25. In a machine of the character described, a work support for sheet material to be operated upon, tools located upon opposite sides of the sheet material on the work support to operate through the work support and upon the sheet material, means for moving the work support along a given path during treatment of the sheet material by said tools, and a pawl and ratchet mechanism automatically operative during return of the work support to its initial position to move the work support in a direction at a right angle to said path preliminarily to movement of the work support along a path parallel to the first-mentioned path during treatment of the sheet material by said tools.

26. In a machine of the character described, a work support in the form of an open frame member to support a sheet of material, tools upon opposite sides of the plane of the sheet material to operate upon the sheet material from opposite sides thereof, a slide member upon which the work support is movable in one direction, a support upon which the slide member is movable in a direction at a right angle to the first-mentioned direction, and means for moving the work support and its supporting slide member along a given path during treatment of the sheet material by said tools, and means for moving the work support on its slide member in a direction at a right angle to said path preliminarily to movement of the work support and its supporting slide member along a path parallel to the first-mentioned path during treatment of the sheet material by said tools whereby the sheet material is treated successively along parallel lines.

27. A work support in the form of an open frame for supporting a sheet of material, work treating tools located to operate along lines substantially perpendicular to the plane of the open frame, means for moving the work support along a given path in said plane during treatment of the sheet material by said tools, a work rest projecting into said open frame from below to support the sheet material closely adjacent to the portion treated by said tools, and presser members upon each side of said tools and arranged to co-operate with said work rest to hold the portion of the sheet material being treated by said tools against distortion or displacement.

28. A work support in the form of an open frame for supporting a sheet of material, tools to cut slits in the sheet, means for moving the work support along a given path during slitting of the sheet material by said tools, work rest members projecting into the open frame from below and spaced from each other to permit operation of the tools between them, and spaced presser members above the plane of the sheet material operative to press portions of the latter against said work rest members to hold said portions against displacement or distortion during slitting of the sheet material by said tools.

EARL A. BESSOM.
CHARLES H. PEPIN.